United States Patent [19]

Bolli

[11] 4,048,003

[45] Sept. 13, 1977

[54] APPARATUS FOR THE TRANSVERSAL WELDING AND SEVERING OF SUPERPOSED WEBS

[75] Inventor: Hans-Ulrich Bolli, Schleitheim, Switzerland

[73] Assignee: SIG Schweizerische Industrie-Gesellschaft, Neuhausen am Rheinfall, Switzerland

[21] Appl. No.: 639,606

[22] Filed: Dec. 10, 1975

[30] Foreign Application Priority Data

Jan. 27, 1975 Switzerland .......................... 914/75

[51] Int. Cl.$^2$ ...................... B32B 31/18; B32B 31/20
[52] U.S. Cl. ................................. 156/515; 93/33 H; 93/DIG. 1; 156/582
[58] Field of Search .............. 156/515, 582, 251, 518, 156/583; 53/182 R, 182 M; 93/33 H, DIG. 1

[56] References Cited

U.S. PATENT DOCUMENTS

| | | | |
|---|---|---|---|
| 3,083,757 | 4/1963 | Kraft et al. ..................... | 156/582 X |
| 3,415,704 | 12/1968 | Bate ..................................... | 156/515 |
| 3,453,801 | 7/1969 | Stohlquist ........................... | 156/515 |
| 3,782,072 | 1/1974 | Sorensen et al. ................ | 156/515 X |

*Primary Examiner*—Charles E. Van Horn
*Assistant Examiner*—M. G. Wityshyn

*Attorney, Agent, or Firm*—Spencer & Kaye

[57] ABSTRACT

An apparatus for the periodic transverse welding and severing of longitudinally advanced superposed wrapper sheets has two oppositely rotating, cooperating welding shoes, at least one of which is provided with a heater and at least one of which is displaced towards its rotary axis by virtue of the engagement between the welding shoes during each revolution thereof. One welding shoe has a tapered terminal head which includes leading and trailing flanks as well as a cutting edge. The other welding shoe has a counterface cooperating with the cutting edge and two elastic, rod-like members arranged adjacent and parallel to the counterface. As the welding shoes simultaneously engage the superposed wrapper sheets from opposite sides, the leading flank of the tapered head, cooperating with one of the elastic rod-like members pinches the wrapper sheets and provides a first transverse weld seam. Thereafter, the cutting knife, cooperating with the counterface, severs the sheets adjacent and parallel to the first weld seam. Subsequently, the trailing flank of the tapered head, cooperating with the other elastic rod-like member, pinches the wrapper sheets and provides a second transverse weld seam adjacent and parallel to the transverse cut.

6 Claims, 5 Drawing Figures

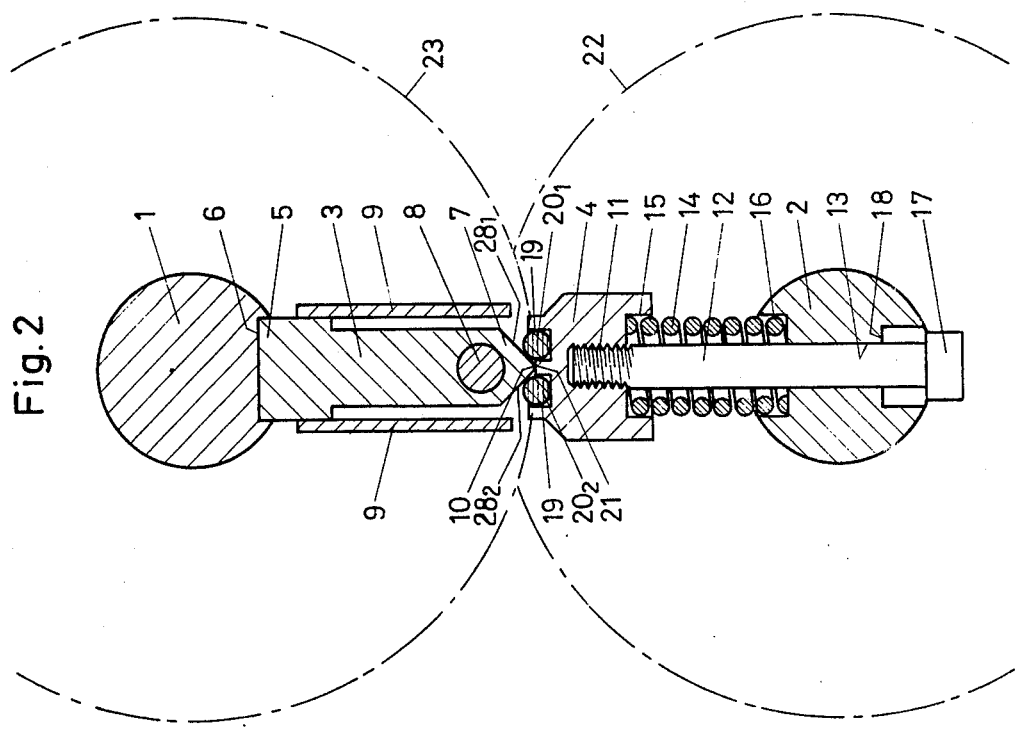
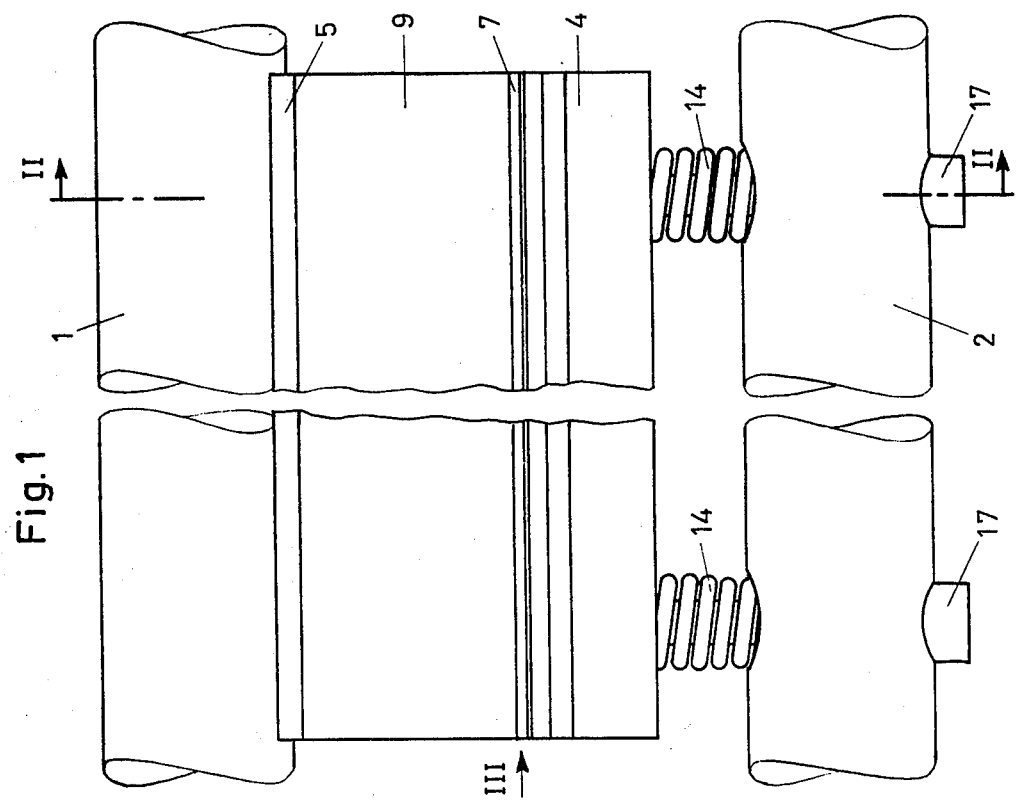

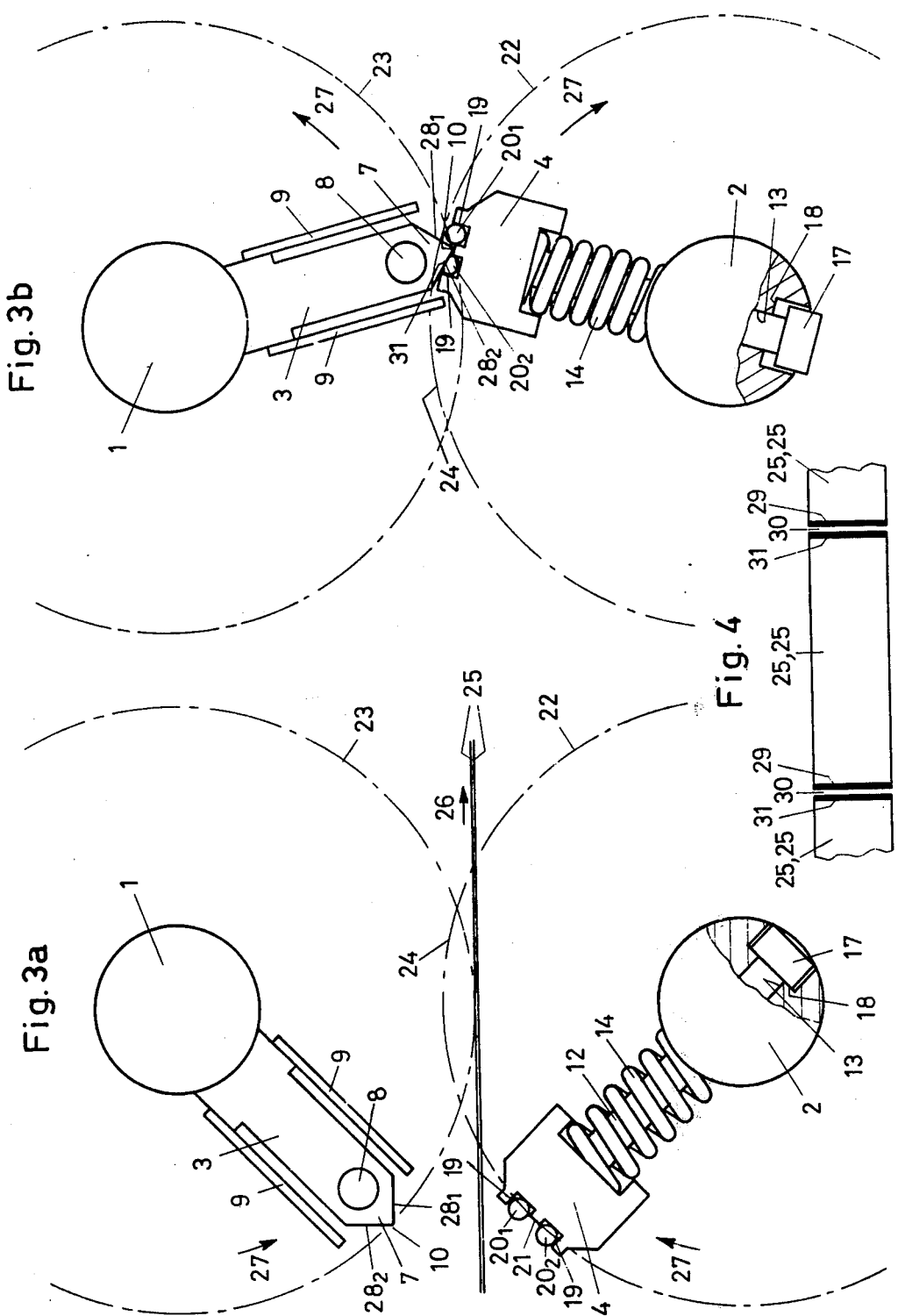

APPARATUS FOR THE TRANSVERSAL WELDING AND SEVERING OF SUPERPOSED WEBS

BACKGROUND OF THE INVENTION

This invention relates to an apparatus or the transversal welding and cutting of face-to-face arranged wrapper webs or wall portions of a wrapper hose.

U.S. Pat. No. 3,007,295 describes an apparatus which, within the framework of continuous package making, serves for bonding together oppositely located wall portions of a wrapper hose by means of a transversal weld seam. The apparatus has two oppositely rotating welding shoes which engage simultaneously and from opposite sides the above-mentioned wall portions and, as a result, provide a relatively wide weld seam which, subsequently, is severed by means of a cutting mechanism. Thus, in this manner there are obtained, from the original, relatively wide single weld seam, two relatively narrow weld seams which close off one package at its rear terminus and the successive package at its front terminus.

It is further known to design the welding shoes proper in such a manner that, by means of a knife and a counterface which are provided on the one and the other welding shoe, the weld seam is severed as it is formed. These devices which may be used for the welding and severing of parallel-arranged (face-to-face superposed) wrapper webs, dependent upon the particular web material, often do not operate in a satisfactory manner. In particular, in case of a very thin wrapper, difficulties arise which may result in an unsatisfactory product and/or in a breakdown of the packaging operation. Non-coated wrapper sheets made, for example, of synthetic material such as polyethylene, cannot be treated at all in the above-outlined manner.

SUMMARY OF THE INVENTION

It is an object of the invention to provide an improved apparatus of the above-outlined type from which the discussed disadvantages are eliminated.

This object and others to become apparent as the specification progresses, are accomplished by the invention, according to which, briefly stated, the apparatus for the periodic transverse welding and severing of longitudinally advanced superposed wrapper sheets has two oppositely rotating, cooperating welding shoes, at least one of which is provided with a heater and at least one of which is displaced towards its rotary axis by virtue of the engagement between the welding shoes during each revolution thereof. One welding shoe has a tapered terminal head which includes leading and trailing flanks as well as a cutting edge. The other welding shoe has a counterface cooperating with the cutting edge and two elastic, rod-like members arranged adjacent and parallel to the counterface. As the welding shoes simultaneously engage the superposed wrapper sheets from opposite sides, the leading flank of the tapered head, cooperating with one of the elastic rod-like members, pinches the wrapper sheets and provides a first transverse weld seam. Thereafter, the cutting knife, cooperating with the counterface, severs the sheets adjacent and parallel to the first weld seam. Subsequently, the trailing flank of the tapered head, cooperating with the other elastic rod-like member, pinches the wrapper sheets and provides a second tranverse weld seam adjacent and parallel to the transverse cut.

BRIEF DESCRIPTION OF THE DRAWINGS

FIG. 1 is a front elevational view of a preferred embodiment of the invention.

FIG. 2 is a sectional view taken along line II—II of FIG. 1.

FIGS. 3a and 3b are side elevational views of the preferred embodiment, showing two different operational phases in one cycle of operation as viewed in the direction of arrow III of FIG. 1.

FIG. 4 is a top plan view of a wrapper welded and severed by an apparatus structured according to the invention.

DESCRIPTION OF THE PREFERRED EMBODIMENT

Turning now to FIGS. 1 and 2, the apparatus shown therein includes two parallel vertically spaced, oppositely rotating shafts 1 and 2 to which there are attached welding shoes 3 and 4, respectively. The welding shoe 3 which may be made of steel, has a foot 5 which is partially received in an axial groove 6 of the shaft 1. The welding shoe 3 further has a wedge-shaped tapered head 7 formed of a leading flank $28_1$, a trailing flank $28_2$ and a knife edge 10. An electric heating rod 8 is embedded in the welding shoe 3 in the vicinity of the head 7. To both sides of the welding shoe 3, at the foot 5, there are attached two cover plates 9 which extend as far as the head 7 but stop short of its terminal cutting edge 10.

The welding shoe 4 is secured to the ends of two bolts 12 by means of bolt threads 11. The bolts 12 extend through diametrically oriented bores 13 provided in the shaft 2. The bolts 12 are axially displaceable within the bores 13. A strong compression spring 14 is arranged on each bolt 12 between the welding shoe 4 and the shaft 2. The ends of each spring 14 project into two depressions 15 and 16 provided, respectively, in the welding shoe 4 and in the shaft 2. The springs 14 urge the welding shoe 4 away from the shaft 2 until the heads 17 of the bolts 12 abut against the shoulders 18 of the bores 13, as it may be particularly well observed in FIG. 3a.

The welding shoe 4 is itself not heated directly although such a possibility is feasible. Two preferably outwardly narrowing longitudinal grooves 19 are provided at the head of the welding shoe 4. Rods $20_1$ and $20_2$ formed preferably of heat resistant artificial rubber, are received and firmly held in the two longitudinal grooves 19, and have a cylindrical surface projecting outwardly of the grooves. The outer end of the welding shoe 4 has, between the two grooves 19, a narrow, flat, strip-like surface 21 which serves as a counterface for the knife edge 10 of the welding shoe 3 as well seen in FIG. 2. If the welding shoe 4 is maintained by the springs 14 at its maximum distance from the shaft 2, the counterface 21 describes a cylindrical surface 22 having the same radius as the cylindrical surface 23 described by the knife edge 10. Stated differently, the first distance between the knife edge 10 and the rotary axis of the shaft 1 is identical to the second distance between the counterface 21 and the rotary axis of the shaft 2. It is feasible, however, to provide that the second distance is less than the first distance; the ratio of the second distance to the first distance advantageously being between 0.96 and 0.99.

The segment 24 of the cylinder face 22 which lies within the outline of the cylinder defined by the cylindrical surface 23 can, however, not be scanned by the counterface 21 because as the circular traveling paths of the knife edge 10 and the counterface 21 are about to intersect, these two components abut one another and thus the welding shoe 4 is shifted by the rigid welding shoe 3 towards the shaft 2 against the force of the springs 14. Thus, when the two welding shoes are out of contact with one another, the sum of the above-defined first and second distances is greater than the distance between the axes of the shafts 1 and 2.

Immediately underneath the cylinder surface 23 described by the knife edge 10 during its rotation, two superimposed webs 25 made of a weldable synthetic wrapper are drawn forwardly in the direction of the arrow 26, for example, by means of a pitch roller pair, not shown, with a speed which corresponds to the circumferential speed of the knife edge 10. This speed need not necessarily be uniform, but may vary conventionally within one operational cycle, that is, during the course of one revolution of the welding shoes 3 and 4. In particular, during the periods of cooperation between the two welding shoes 3 and 4, the speed may be somewhat less than the average speed.

In the description which follows, the operation of the above-described apparatus will be explained with particular reference to FIGS. 3a and 3b.

As welding shoes 3 and 4 approach each other upon movement from their position shown in FIG. 3a in the direction of arrows 27, the two webs 25 are eventually pinched between the leading wedge flank $28_1$ of the welding shoe head 7 and the elastically yielding rubber rod $20_1$ in a very gentle but firm manner. The strip-shaped area of pinching engagement is intensively heated so that the webs 25 are bonded to one another by means of a first transversal weld seam 29 as illustrated in FIG. 4. This operation completes the first welding phase.

Upon continuing rotation of the welding shoes 3 and 4, the latter arrive in the position shown in FIG. 2 in which the knife edge 10, cooperating with the counterface 21, cuts through the heated web 25 with one transverse cut 30. The webs 25 are not shown in FIGS. 2 and 3b for the sake of clarity. FIG. 3b illustrates a second welding phase which is subsequent to the cutting phase and in which the trailing wedge flank $28_2$ and the rubber bar $20_2$ firmly hold the webs 25 and in this manner produce a second weld seam 31.

The above-described apparatus is particularly advantageous for the transversal welding and cutting of oppositely located, flattened, face-to-face engaging wall portions of a wrapper hose in the continuous manufacture of packages. The welding and the cutting of two superposed individual wrapper webs is shown and described only for the purpose of simpler pictorial illustration rather than the most advantageous form of application. It will be readily seen that instead of two wrapper sheets, three or more such sheets may be welded to one another and severed.

It is a particular advantage of the two cover plates 9 that they prevent an excessive heating of the webs 25 prior to and subsequent to the two welding phases and they also may serve as hold-down devices.

With the above-described apparatus webs and hoses made of very thin synthetic sheet material may be welded together. Such operation could not be satisfactorily performed with conventional devices.

It will be understood that it is feasible to arrange the welding shoe 3 to be radially displaceable with respect to its shaft 1, rather than the welding shoe 4. It is also feasible to provide such a feature for both welding shoes.

For a more precise and variable control of the contact pressure between the welding shoes 3 and 4, the springs 14 may be replaced by pneumatic power cylinders forming part of a pneumatic control circuit. In this manner, the welding pressure may be varied, for example, dependent upon the particular wrapper material. It is noted, however, that such a pressure control is, as a rule, unnecessary for a fully satisfactory operation of the apparatus.

It will be understood that the above description of the present invention is susceptible to various modifications, changes and adaptations, and the same are intended to be comprehended within the meaning and range of equivalents of the appended claims.

What is claimed is:

1. In an apparatus for the periodical transverse welding and severing of longitudinally advanced wrapper sheets being in a superposed, face-to-face relationship with respect to one another; the apparatus having first and second oppositely rotated, cooperating welding shoes between which the wrapper sheets pass; the first welding shoe being secured to a first rotary shaft and the second welding shoe being secured to a second rotary shaft; each rotary shaft having an axis; at least one of the welding shoes carrying heating means; a knife edge carried by the first welding shoe; a counterface carried by the second welding shoe and cooperating with the knife edge; upon each revolution of the welding shoes the latter simultaneously engage the wrapper sheets from opposite sides for transversely welding and severing the wrapper sheets; the improvement comprising:
    a. mounting means for radially displaceably securing at least one of said welding shoes to its respective shaft to provide for a displacement of said at least one welding shoe towards its shaft upon abutment with the other welding shoe during encounter therewith; said mounting means including
        1. force exerting means for urging the welding shoe radially outwardly relative to the respective shaft; and
        2. a stop determining the outermost position of the welding shoe relative to its shaft; the distance between the axes of said rotary shafts being smaller than the sum of the distances of said knife edge and said counterface from the axis of their respective rotary shaft in said outermost position of the welding shoes;
    b. a wedge-shaped tapered head forming an outer terminal part of said first welding shoe; said head having a leading flank and a trailing flank and ending in an edge constituting said knife edge; and
    c. two elongated rod-like resilient members secured to said second welding shoe adjacent and parallel to said counterface on either side thereof; during each revolution of said welding shoes one of said rod-like members engages said leading flank of said head for providing a first weld seam on said wrapper sheets and the other of said rod-like members engages said trailing flank of said head for providing a second weld seam on said wrapper sheets; said knife edge, in cooperation with said counterface, severing said wrapper sheets subsequent to forming said first weld seam and prior to forming said second weld seam.

2. An apparatus as defined in claim 1, wherein said first welding shoe being rigidly affixed to said first shaft; said mounting means being connected to said second welding shoe and said second shaft; said mounting means further including means defining a diametral bore and a shoulder in said second shaft, a bolt slidably extending through said bore and having a first end attached to said second welding shoe, said bolt having a second end carrying a bolt head cooperating with said shoulder to constitute said stop, and a compression spring engaging said second shaft and said second welding shoe for urging said second welding shoe away from said second shaft and for maintaining said bolt head in engagement with said shoulder as long as said welding shoes are out of contact with one another.

3. An apparatus as defined in claim 2, wherein said heating means is carried solely by said first welding shoe; said second welding shoe including means defining two grooves extending adjacent and parallel to said counterface at either side thereof; said rod-like members being received and held in said grooves.

4. An apparatus as defined in claim 3, wherein said rod-like members are made of rubber.

5. An apparatus as defined in claim 2, wherein the ratio of the distance of said counterface from the axis of its associated shaft to the distance of said knife edge from the axis of its associated shaft is, in said outermost position, between 0.96 and 0.99.

6. An apparatus as defined in claim 1, including two closure plates attached to opposite sides of the welding shoe provided with said heating means; said closure plates protecting said wrapper sheets from radiating heat prior to the forming of said first weld seam and subsequent to the forming of said second weld seam.

* * * * *